(12) United States Patent
James

(10) Patent No.: US 9,432,477 B2
(45) Date of Patent: Aug. 30, 2016

(54) IDENTIFYING MATCHING VIDEO CONTENT

(71) Applicant: ZEFR, Inc., Venice, CA (US)

(72) Inventor: Zacharias Lee James, Venice, CA (US)

(73) Assignee: ZEFR, INC., Venice, CA (US)

( * ) Notice: Subject to any disclaimer, the term of this patent is extended or adjusted under 35 U.S.C. 154(b) by 229 days.

(21) Appl. No.: 14/231,285

(22) Filed: Mar. 31, 2014

(65) Prior Publication Data
US 2015/0278292 A1 Oct. 1, 2015

(51) Int. Cl.
*G06F 17/30* (2006.01)
*H04L 29/08* (2006.01)
*H04N 21/466* (2011.01)
*H04N 21/482* (2011.01)
*H04N 21/45* (2011.01)

(52) U.S. Cl.
CPC ......... *H04L 67/30* (2013.01); *G06F 17/30817* (2013.01); *H04L 67/06* (2013.01); *H04N 21/4532* (2013.01); *H04N 21/4668* (2013.01); *H04N 21/4826* (2013.01)

(58) Field of Classification Search
CPC .................... G06F 17/30386; G06F 17/30817
See application file for complete search history.

(56) References Cited

U.S. PATENT DOCUMENTS

| | | | | |
|---|---|---|---|---|
| 5,758,257 A | * | 5/1998 | Herz | G06Q 20/383 348/E7.056 |
| 2013/0343598 A1 | * | 12/2013 | Kocks | H04N 21/8405 382/100 |
| 2014/0298364 A1 | * | 10/2014 | Stepanov | H04N 21/25 725/10 |
| 2015/0237389 A1 | * | 8/2015 | Grouf | H04N 21/26283 725/49 |

* cited by examiner

*Primary Examiner* — Rehana Perveen
*Assistant Examiner* — Alexander Khong
(74) *Attorney, Agent, or Firm* — Kunzler Law Group; Scott D. Thorpe

(57) ABSTRACT

For identifying matching video content, a method records characteristics of a plurality of videos. The characteristics include one or more of keywords, views, comments, subscriptions to content channels, uploaded content, likes, user followings, and user identities. The method further calculates a content profile for each video. In addition, the method identifies a matching content profile within a content proximity of a target video content profile.

11 Claims, 9 Drawing Sheets

120

130

125

325

| Content 305 | Content Keyword 310 | Content Tag 315 | Content Description 320 |
|---|---|---|---|
| Content 305 | Content Keyword 310 | Content Tag 315 | Content Description 320 |
| Content 305 | Content Keyword 310 | Content Tag 315 | Content Description 320 |
| Content 305 | Content Keyword 310 | Content Tag 315 | Content Description 320 |

| |
|---|
| Identification Algorithm 330 |
| Weight Vector 335 |
| Like Threshold 340 |
| Following Threshold 345 |
| Proximity Threshold 370 |
| Popularity Threshold 375 |

FIG. 2D

IDENTIFYING MATCHING VIDEO CONTENT

BACKGROUND

1. Field

The subject matter disclosed herein relates to identifying content and more particularly relates to identifying matching video content.

2. Description of the Related Art

A content host may allow users to view videos. Users typically view additional videos when a viewed video is linked to other similar videos.

BRIEF SUMMARY

A method for identifying matching video content is disclosed. The method records characteristics of a plurality of videos. The characteristics include one or more of keywords, views, comments, subscriptions to content channels, uploaded content, likes, user followings, and user identities. The method further calculates a content profile for each video. In addition, the method identifies a matching content profile within a content proximity of a target video content profile. An apparatus and computer program product also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2D is a schematic block diagram illustrating one embodiment of a content profile policy;

DETAILED DESCRIPTION

Figure 1A:
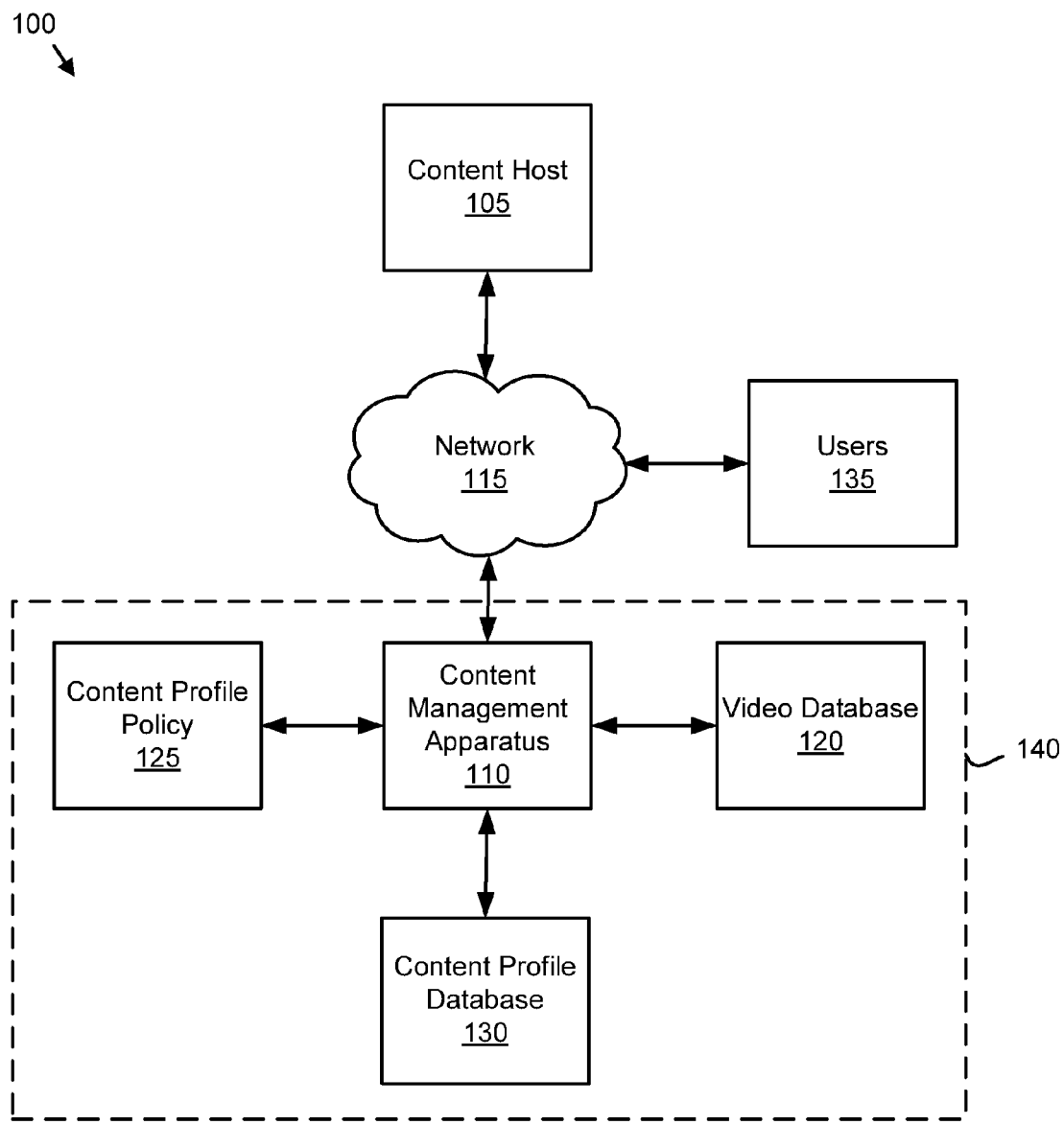
FIG. 1A is a schematic block diagram illustrating one embodiment of a video content system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing program code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in program code and/or software for execution by various types of processors. An identified module of program code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the program code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code for carrying out operations for embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by program code. These program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Descriptions of Figures may refer to elements described in previous Figures, like numbers referring to like elements. FIG. 1A is a schematic block diagram illustrating one embodiment of a video content system 100. The system 100 identifies matching video content that is available for viewing from a content host 105. The matching video content matches a target video which is also available for viewing from the content host 105. The system 100 includes the content host 105, a content provider 140, a network 115, a content management apparatus 110, a video database 120, a content profile policy 125, and a content profile database 130.

The content host 105 provides videos over the network 115 to one or more users 135. The network 115 may be the Internet, a mobile telephone network, a wide area network, a local area network, a Wi-Fi network, or combinations thereof.

The content provider 140 may upload videos to the content host 105 and the content host 105 may provide those videos to the users 135. In addition, the content provider 140 may link videos to and/or from videos uploaded by users 135. The content provider 140 may derive revenue based on views of the uploaded videos or videos uploaded by others and claimed by the content host 105. For example, when advertising is displayed, such as on a webpage displaying a video, in a clip that precedes the video, as an overlay over a portion of the video, or at an end of the video, the content provider 140 may receive a portion of the advertising revenue. As a result, it is to the content provider's advantage to increase views of the uploaded videos.

Views of a target video may be increased when the target video is linked to other similar, relevant video content. For example, linking to similar, relevant video content may encourage reciprocal links. In addition, linking to similar, relevant content that is also owned and/or managed by the content provider 140 will increase overall revenues for the content provider 140.

Unfortunately, identifying the similar, relevant video content may be a labor-intensive, manual process. As a result, much of video content that is similar to the target video may not be identified because of the expense of an exhaustive search. In addition, current processes for identifying video content do not identify all similar, relevant video content for the target video, or do not identify the most relevant and/or profitable video content for linking with the target video. As a result, revenues for the target video are not maximized.

The embodiments described herein record characteristics of a plurality of videos. The embodiments further calculate a content profile for each video. In addition, the embodiments identify matching content profiles within a content proximity of a target video content profile. The videos of the matching content profiles may be linked to the target video to increase the views and the revenues of the target video and/or the linked videos.

The content provider 140 may store videos in the video database 120. The video database 120 may include videos that are owned and/or managed by the content provider 140. Videos that are owned and/or managed by the content provider 140 are referred to herein as managed videos. The video database 120 may also store videos that are not owned and/or managed by the content provider 140, videos that are referred to hereafter as third-party videos.

The content management apparatus 110 may generate content profiles for the videos of the video database 120. The content profiles may be organized to facilitate the matching of videos in the video database 120 with the target video. The content profiles may be stored in the content profile database 130.

In one embodiment, the content management apparatus 110 parses a video to automatically generate characteristics of the video. In addition, the content management apparatus 110 may download metadata characteristics for the video from the content host 105 through the network 115. In one embodiment, the content management apparatus 110 receives administrator input characteristics for the video.

The characteristics may be processed to calculate the content profile for the video. In addition, a content profile may be calculated for a target video. The content management apparatus 110 may further identify matching content profiles that match the content profile of the target video. The videos of the matching content profiles may be linked to the target video so that more similar, relevant videos are linked for the target video.

Figure 1B:
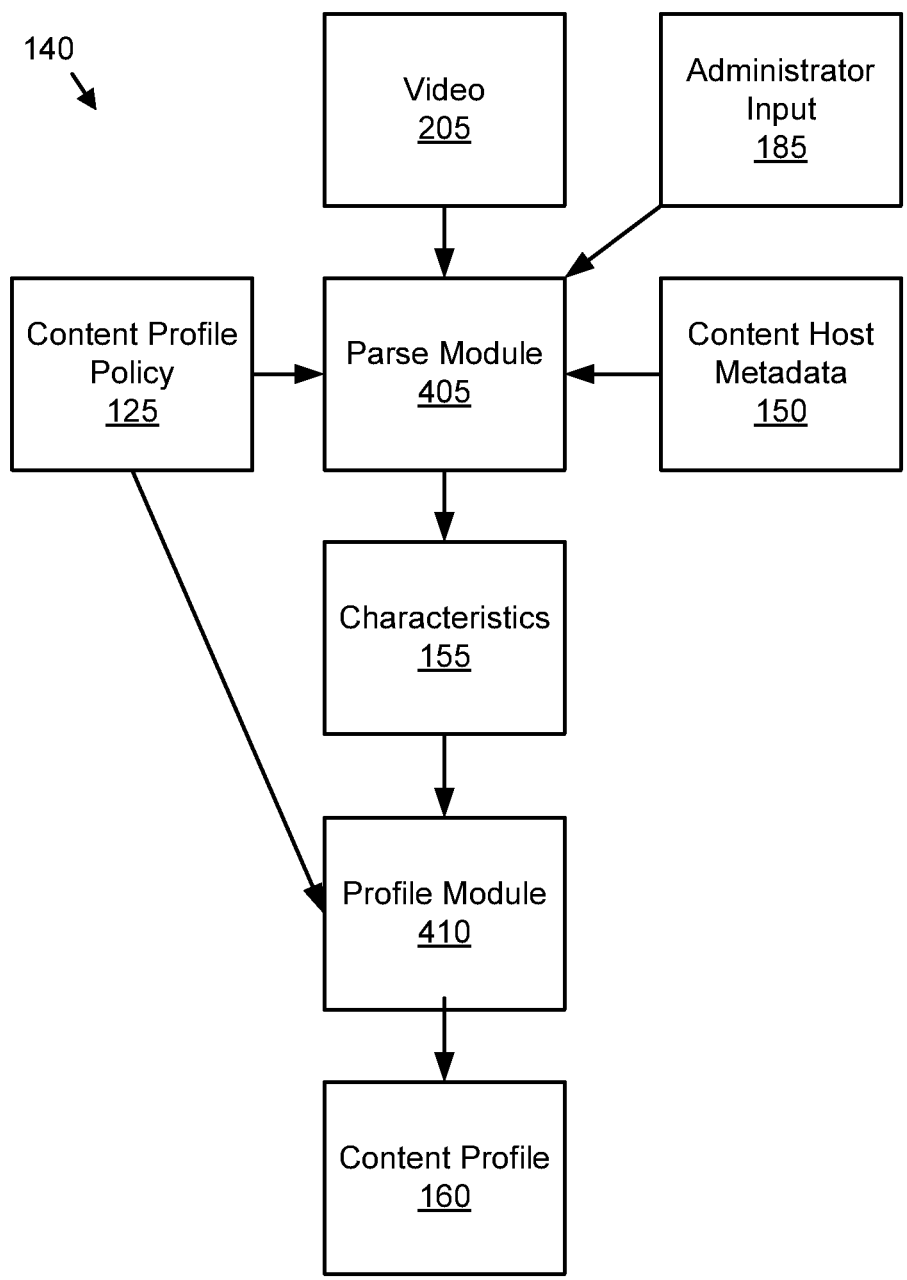
FIG. 1B is a schematic block diagram illustrating one embodiment of a content profile generation process.

FIG. 1B is a schematic block diagram illustrating one embodiment of a content profile generation process 140. The process 140 illustrates one embodiment of the flow of data for the system 100 of FIG. 1A. A parse module 405 of the content management apparatus 110 receives a video 205. The video 205 may be a target video. Alternatively, the video 205 may be a video from the video database 120.

The parse module 405 may also download content host metadata 150 from the content host 105. The metadata may include view data, comment data, subscription data, upload data, like data, user data, following data, ownership data, and the like. The metadata may be stored as the characteristics 155 of the video 205.

In addition, the parse module 405 may consult the content profile policy 125. In response to the content profile policy 125 the parse module 405 may parse, process, and record characteristics 155 of the video 205 and the content host metadata 150. The parse module 405 may record the characteristics 155. In addition, the parse module 405 may process and record characteristics 155 from the administrator input 185.

For example, the parse module 405 may identify images, words, music, and the like from the video and generate the characteristics 155 based on those images, words, and music. For example, the parse module 405 may select one or more representative images from the video 205 and match the selected representative images against images from the content profile policy 125. The parse module 405 may generate a keyword for the video 205 in response to the match of the selected representative images and the image from the content profile policy 125.

Similarly, the parse module 405 may identify content, characters, and topics of the video 205 by comparing selected portions of the video 205 with the content profile policy 125. In one embodiment, the parse module 405 generates keywords and tags as characteristics 155 of the video 205 by parsing the video 205 and comparing the parsed content with the content profile policy 125.

The profile module 410 may calculate the content profile 160 for the video 205. The content profile 160 may include the characteristics 155 and data calculated from the characteristics 155. For example, comment data, subscription data, following data and like data may be used to calculate popularity data. In addition, user data, content data, character data, and topic data may be used to calculate demographic data.

Figure 1C:
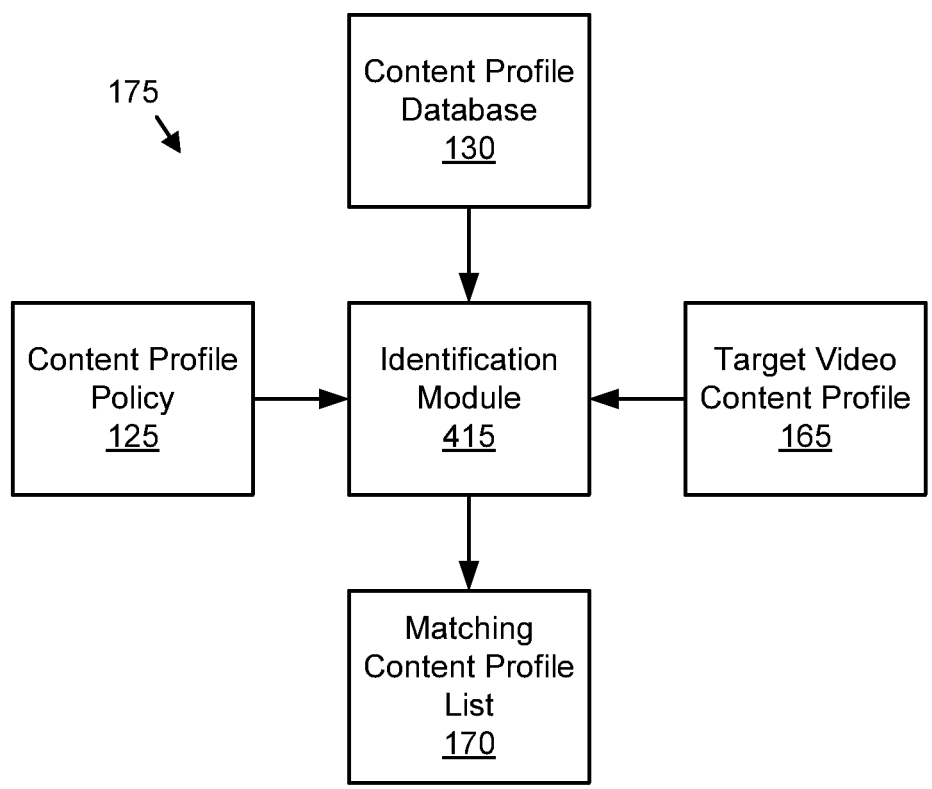
FIG. 1C is a schematic block diagram illustrating one embodiment of a matching content profile identification process.

FIG. 1C is a schematic block diagram illustrating one embodiment of a matching content profile identification process 175. The process 175 illustrates one embodiment of the flow of data for the system 100 of FIG. 1A.

in the depicted embodiment, an identification module 415 of the content management apparatus 110 receives the target video content profile 165 for a target video. The identification module 415 further consults the content profile database 130 and the content profile policy 125 to identify one or more matching content profiles within a content proximity of the target video content profile 165. In one embodiment, the identification module 415 generates a matching content profile list 170 with the matching content profiles 160 that are within the content proximity of the target video content profile 165.

Figure 2A:
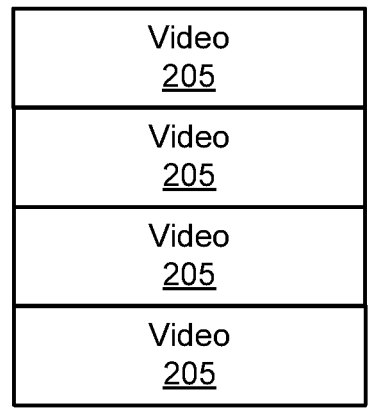
FIG. 2A is a schematic block diagram illustrating one embodiment of a video database.

FIG. 2A is a schematic block diagram illustrating one embodiment of the video database 120. The video database 120 may be stored in a memory. The video database 120 may be organized as one or more database tables. The video database 120 stores a plurality of videos 205. Each video 205 may include a video file. In addition, each video 205 may include metadata for the video 205. The metadata may be downloaded from the content host 105. The metadata may include views, comments, subscriptions to content channels, uploaded content, likes, like it entities, user followings, and following identities.

Figure 2B:
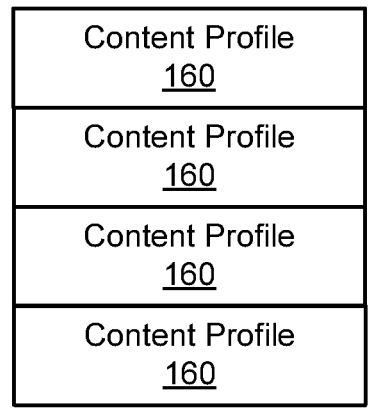
FIG. 2B is a schematic block diagram illustrating one embodiment of a content profile database.

FIG. 2B is a schematic block diagram illustrating one embodiment of the content profile database 130. The content profile database 130 may be stored in the memory. The content profile database 130 may be organized as one or more database tables, linked data structures, flat files, or combinations thereof. The content profile database 130 may store a plurality of content profiles 160. In one embodiment, a content profile 160 is generated for each video 205 of the video database 120. In addition, content profile 160 may be generated for a target video of the videos 205.

Figure 2C:
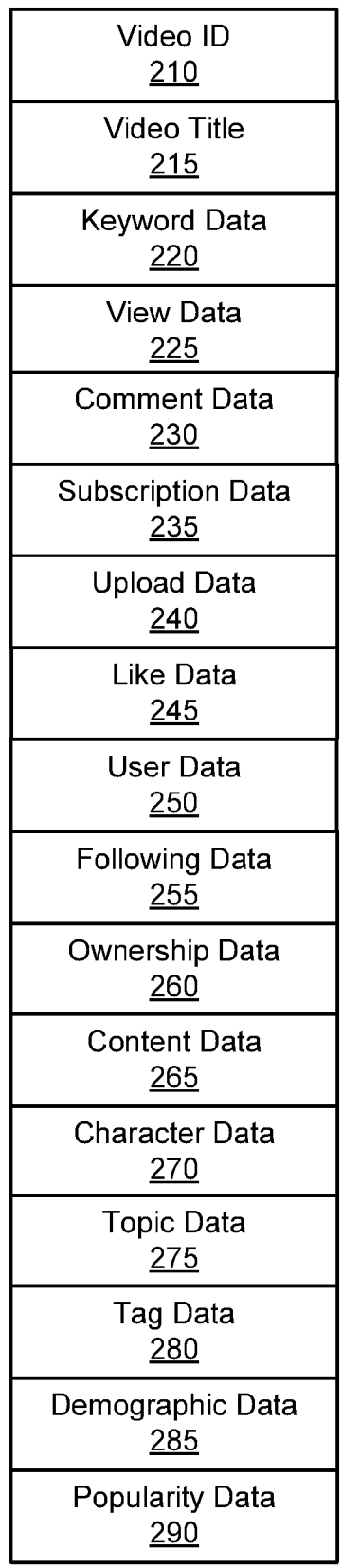
FIG. 2C is a schematic block diagram illustrating one embodiment of a content profile.

FIG. 2C is a schematic block diagram illustrating one embodiment of a content profile 160. The content profile 160 may be a database entry, a data structure, and/or a flat file. In the depicted embodiment, the content profile 160 includes a video identifier 210, a video title 215, keyword data 220, view data 225, comment data 230, subscription data 235, upload data 240, like data 245, user data 250, following data 255, ownership data 260, content data 265, character data 270, topic data 275, tag data 280, demographic data 285, and popularity data 290.

The video identifier 210 may uniquely identify the video 205. The video identifier 210 may include a content host index. In addition, the video identifier 210 may include a video database identifier.

The video title 215 may include a formal title for the video 205. In addition, the video title 215 may include a descriptive title that describes the content of the video 205.

The keyword data 220 includes one or more keywords that describe the video 205. The keywords may be parsed from the metadata description downloaded from the content host 105. Alternatively, the keywords may be parsed from the video 205 by the parse module 405.

The view data 225 may include a number of views of the video 205 on the content host 105. In addition, the view data 225 may include a number of views of the video 205 on the content host 105 by time interval. The time interval may be an hourly, daily, weekly, monthly, and/or yearly time interval. In one embodiment, the view data 225 may include a user identifier for each user 135 that views a video 205 and a timestamp for the viewing. In one embodiment, the view data 225 includes a view score. The view score may be calculated from the view data 225.

The comment data 230 may include comments posted for the video 205 on the content host 105. In addition, the common data 230 may include the user identifiers for the users 135 that post of the comments. In one embodiment, the comment data 230 includes a comment score. The comment score may be calculated from the comment data 230.

In one embodiment, the comment score is calculated as a sum of positive comments divided by a sum of total comments for the video 205. In an alternative embodiment, the comment score is calculated as a function of positive phrases and negative phrases within the comments.

The subscription data 235 may include a number of subscriptions to one or more content channels that include the video 205. In one embodiment, the subscription data 235 includes the user identifiers for the users 135 that subscribe to the content channels. In one embodiment, the subscription data 235 includes a subscription score. The subscription score may be a number of subscriptions to content channels that include the video 205.

The upload data 240 may include identifiers for uploaded content associated with the video 205. In addition, the upload data 240 may include an upload timestamp specified when the video 205 was uploaded to the content host 105.

The like data 245 may include a number of likes for the video 205 on the content host 105. A user 135 may submit a like and/or a dislike to indicate approval and/or disapproval of the video 205. In addition, the like data 245 may include the user identifiers for the users 135 submitting likes for the video 205. In one embodiment, the like data 245 includes a like score. The like score may be calculated as a sum of approvals divided by a sum of total indications of like and/or dislike.

The user data 250 may describe the genders, ages, preferences, comment patterns, like patterns, following patterns, income levels, and the like for the user identifiers of users 135 that viewed the video 205, that commented on the video 205, that subscribe to content channels containing the video 205, that liked or disliked the video 205, and/or that follow users 135 associated with the video 205. The user data 250 may be parsed from the content host metadata, obtained from outside databases, and the like. In one embodiment, the user data 250 includes Internet addresses of the users 135.

The following data 255 may describe individuals including users 135 that follow users 135 associated with the video 205. A user 135 may be associated with the video 205 by commenting on the video 205, subscribing to a content channel that includes the video 205, liking the video 205, and the like. The ownership data 260 may describe an owner of the video 205, a manager of the video 205, and/or other stakeholders of the video 205.

The content data 265 may identify locations, sporting events, films, television programs, theatrical performances, and the like that appear in or are referenced by the video 205. The content data 265 may be parsed from the video 205. In addition, the content data 265 may be identified from the administrator inputs 185.

The character data 270 may identify characters including fictional and animated characters, personalities, groups of people, and the like that appear in or are referenced by the video 205. The character data 270 may be parsed from the video 205. In addition, the content data may be identified from the administrator inputs 185.

The topic data 275 may identify themes, topics, tropes, genres, and the like associated with the video 205. The topic data 275 may be parsed from the video 205. In addition, the topic data 275 may be identified from his illustrator inputs 185.

The demographic data 285 may be calculated from the user data 250, the view data 225, the comment data 230, the subscription data 235, the upload data 240, the like data 245, and the following data 255. In addition, the demographic data 285 may be calculated using outside data sources.

The popularity data 290 may be calculated from the view data 225, the comment data 230, the subscription data 235, and the like data 245. In one embodiment, the popularity data 290 includes a popularity score. The popularity score PS may be calculated using Equation 1, where CS is the comment score, SS is the subscription score, and LS is the like score. K1, K2, and K3 may be nonzero constants.

$$PS=(K1*CS)+(K2*SS)+(K3*LS) \qquad \text{Equation 1}$$

FIG. 2D is a schematic block diagram illustrating one embodiment of a content profile policy 115. The content profile policy 115 may be stored in a memory and may comprise one or more databases, data structures, and the like. In the depicted embodiment, the content profile policy 115 includes a content database 325, identification algorithm 330, a weight vector 335, a like threshold 340, a following threshold 345, a proximity threshold 370, and a popularity threshold 375.

The content database 325 may be used to parse the keyword data 220, the content data 265, the character data 270, and the topic data 275 from the video 205. The content database 325 includes content 305, a content keyword 310, a content tag 315, and a content description 320.

The content 305 may include a video clip, an image, an audio clip, a phrase, and the like. In one embodiment, the video clip, the image, the audio clip, and/or the phrase are hashed. The content keyword 310 may be a keyword associated with the content 305. The content tag 315 may be a tag associated with the content 305. The content description 320 may describe the content 305.

In one embodiment, the parse module 405 parses the video 205 by comparing portions of the video 205 with the content 305. If a portion of the video 205 matches the content 305, the content keyword 310 may be copied to the keyword data 220. In addition, the content tag 315 may be copied to the tag data 280. In one embodiment, if a portion of the video 205 matches the content 305, the content description 320 may be parsed to generate the content data 265, the character data 270, and/or the topic data 275.

The identification algorithm 330 may store one or more algorithms that are used to identify matching content profiles 160. The identification algorithm 330 may be one or more of a linear programming algorithm, a blossom algorithm, an un-weighted bipartite algorithm, a weighted bipartite algorithm, and a maximum matching edge algorithm.

The weight vector 335 may store one or more vectors of weights that may be applied to a difference of content profile elements as will be described hereafter. Alternatively, the weight vector 335 may define the content proximity in a profile space. The like threshold 340 may specify a number of likes required for a content profile 160 to match a target video content profile 165. The following threshold 345 may specify a number of user followings required for a content profile 160 to match the target video content profile 165.

The proximity threshold 370 may be used to determine if a proximity score for a content profile 160 is sufficient for inclusion on the matching content profile list 170. The popularity threshold 375 may also be used to determine if a proximity score for a content profile 160 is sufficient for inclusion on the matching content profile list 170.

Figure 3:
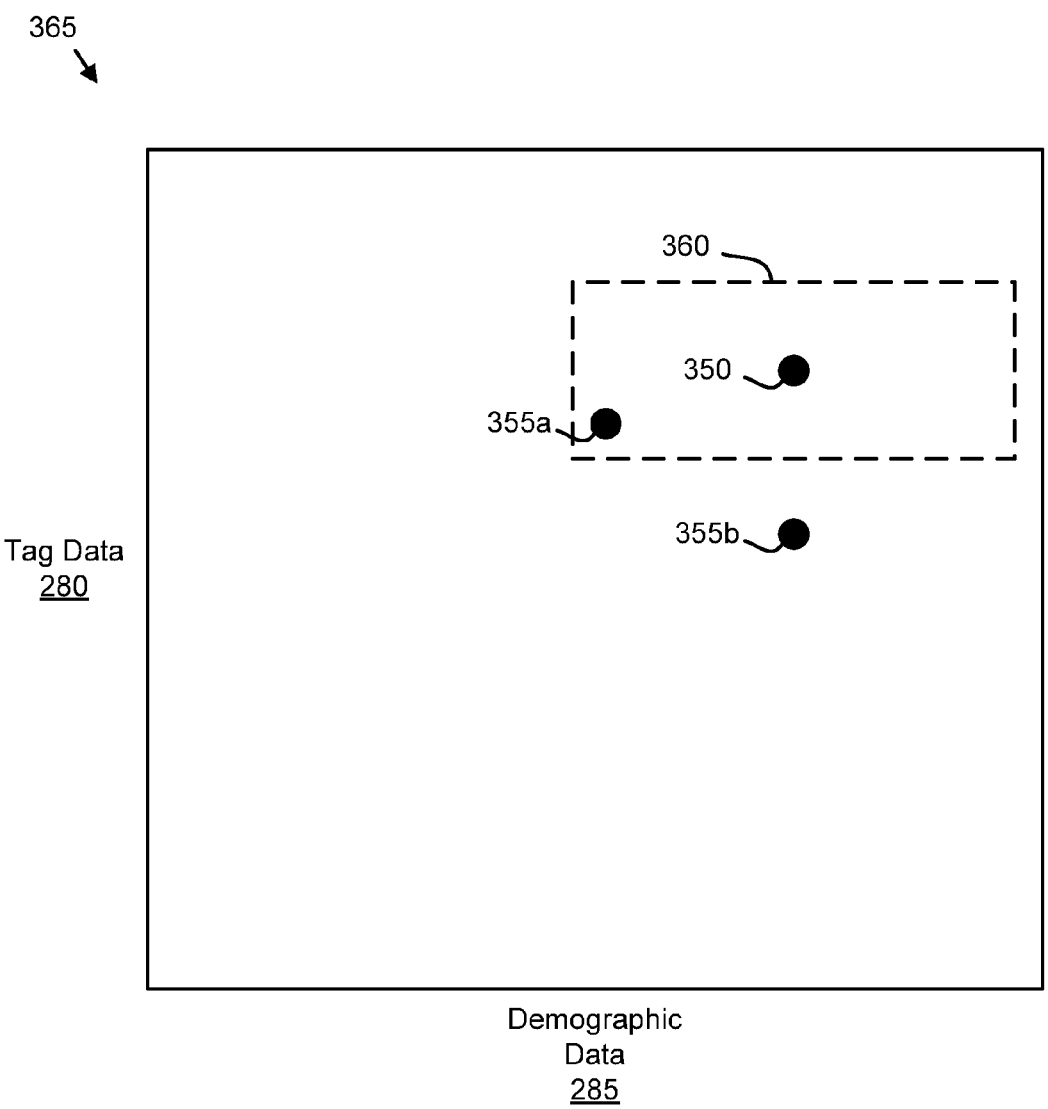
FIG. 3 is a drawing illustrating one embodiment of a profile space.

FIG. 3 is a drawing illustrating one embodiment of a profile space 365. In the depicted embodiment, the profile space 365 is a two-dimensional coordinate space for illustrative purposes. However, the profile space 365 may have any number of dimensions. In one embodiment, the profile space 365 has at least one dimension for each element of the content profile 160. In the depicted embodiment, tag data 280 is represented on the vertical axis and demographic data 285 is represented on the horizontal axis. However, content profile data may be plotted on any of a plurality of axes.

The content profile 160 may be organized as a vector. The content profile 160 and/or content profile vector may be organized as a multidimensional coordinate of the profile space 365. In the depicted embodiment, a target coordinate 350 of the target video content profile 165 is plotted in a profile space 365. Profile coordinates 355 for other content profiles 160 are also plotted.

A content proximity 360 is defined relative to the target coordinate 350. In one embodiment, content profiles 160 with profile coordinates 355 that are within the content proximity 360 match the target video content profile 165. In the depicted embodiment, the content proximity 360 encompasses a broader range of demographic data 285 than of target data 280. The boundaries of the content proximity 360 may be established using the weight vector 335.

Figure 4A:
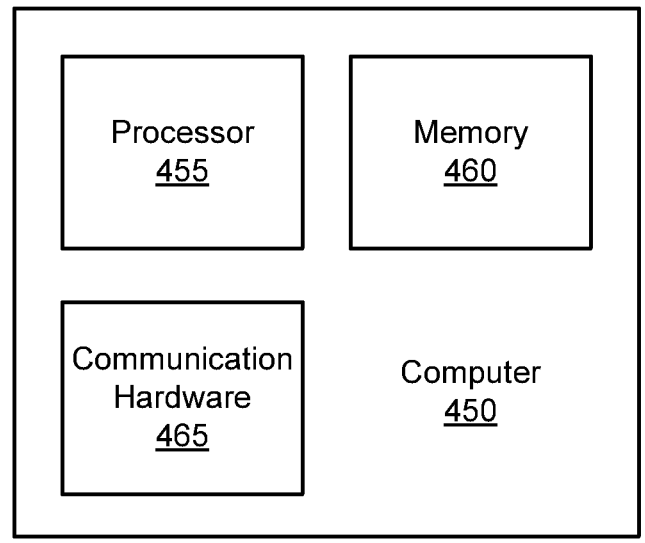
FIG. 4A is a schematic block diagram illustrating one embodiment of a computer.

FIG. 4A is a schematic block diagram illustrating one embodiment of a computer 450. The computer 450 includes a processor 455, a memory 460, and communication hardware 465. The memory 460 may comprise one or more of a semiconductor storage device, a hard disk drive, an optical storage device, a micromechanical storage device, or combinations thereof. The memory 460 may store program code. The processor 455 may execute the program code. The communication hardware 465 may communicate with other devices.

Figure 4B:
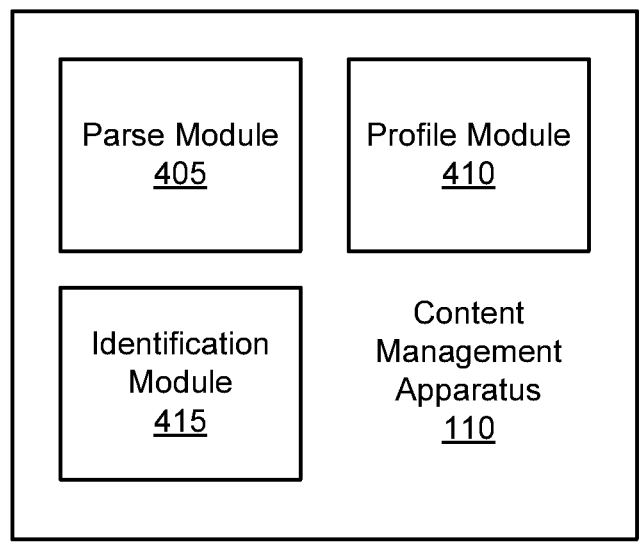
FIG. 4B is a schematic block diagram illustrating one embodiment of a content management apparatus.

FIG. 4B is a schematic block diagram illustrating one embodiment of the content management apparatus 110. The content management apparatus 110 may comprise the parse module 405, the profile module 410, and/or the identification module 415. The parse module 405, profile module 410, and identification module 415 may each be embodied in a computer readable storage device such as the memory 460. The computer readable storage device may store program code that is executed by the processor 455 to perform the functions of the content management apparatus 110.

Figure 5:
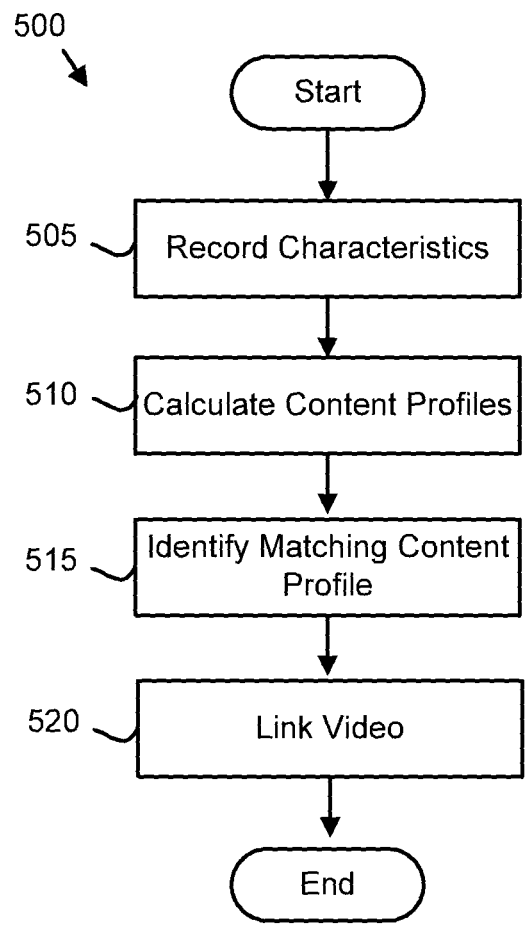
FIG. 5 is a schematic flow chart diagram illustrating one embodiment of an identifying matching video content method.

FIG. 5 is a schematic flow chart diagram illustrating one embodiment of an identifying matching video content method 500. The method 500 may identify matching content profiles 160 that are within a content proximity 360 of the target video content profile 165. The method 500 may perform the functions of the system 100 and/or the content management apparatus 110. In one embodiment, the method 500 is performed by the processor 455. Alternatively, the method 500 may be performed by a computer readable storage medium such as the memory 460. The computer readable storage media may store program code that is executed and/or executable by the processor 455 to perform the functions of the method 500.

The method 500 starts, and in one embodiment, the parse module 405 records 505 characteristics 155 of a plurality of videos 205. The videos 205 may include the videos 205 of the video database 120. In addition, the videos 205 may include the target video. The characteristics 155 may include but are not limited to one or more of keywords, views, comments, subscriptions to content channels, uploaded content, likes, user followings, and user identities.

In one embodiment, the parse module 405 parses the characteristics 155 from each video 205. In addition, the parse module 405 may parse the characteristics 155 the content host metadata 150. In one embodiment, the parse module 405 parses one or more of the characteristics 155 from the administrator inputs 185.

The profile module 410 may calculate 510 the content profile 160 for each video 205. In addition, the profile module 410 may calculate 510 the target video content profile 165 for the target video. For example, the profile module 410 may calculate the keyword data 220, the view data 225, the comment data 230, the subscription data 235, the upload data 240, the like data 245, the user data 250, the following data 255, the ownership data 260, the content data 265, the character data 270, the topic data 275, the tag data 280, the demographic data 285, the popularity data 290 from the characteristics 155.

The identification module 415 may identify 515 one or more matching content profiles 160 that are within the content proximity 360 of the target video content profile 165. In one embodiment, the identification module 415 employs one or more of the identification algorithm 330 to identify 515 the matching content profiles 160. The closest one or more matches of content profiles 160 using the identification algorithm 330 may be the matching content profiles 160.

The content profile 160 may be within the content proximity 360 of the target video content profile 165 if the content profile 160 has a number of likes in the like data 245 that exceeds a like threshold. Alternatively, the content profile 160 may be within the content proximity 360 of the target video content profile 165 if the content profile 160 has a number of user followings in the following data 255 that exceeds a following threshold.

In one embodiment, a content profile 160 is within the content proximity 360 of the target video content profile 165 if the profile coordinates 355 of the content profile 160 is within the volume of the content proximity 360 for the target coordinate 350 of the target video content profile 165, as illustrated in FIG. 3. The volume of the content proximity 360 may be defined by the weight vector 335 where each weight element corresponds to an element of the content profile 160 and each weight defines boundaries of the content proximity 360 in one dimension of the profile space 365. In one embodiment, each content profile 160 with a profile coordinate 355 with the content proximity 360 is included in the matching content profile list 170.

In an alternative embodiment, a content profile 160 is within the content proximity 360 if a proximity score for the content profile 160 exceeds a proximity threshold. The proximity score XS may be calculated using Equation 2, where Ei is a value of the ith content profile element, Ti is a value of the ith corresponding target video content profile element, Wi is a non-zero weight from the weight vector 335, and m is a non-zero constant.

$$XS = m/\Sigma Wi * |Ei - Ti| \qquad \text{Equation 2}$$

In one embodiment, each content profile 160 with a proximity score that exceeds the proximity threshold 370 is included in the matching content profile list 170. Alternatively, content profiles 160 with proximity scores that exceed the proximity threshold 370 may only be included in the matching content profile list 170 by satisfying additional criteria.

In a certain embodiment, content profiles 160 that have a number of likes in the like data 245 that do not exceed the like threshold are removed from the matching content profile list 170. In addition, content profile 160 with a number of user followings in the following data 255 that do not exceed the following threshold may be removed from the matching content profile list 170.

In a certain embodiment, content profiles 160 with popularity scores from the popularity data 290 that are less than the popularity threshold 375 are also removed from the matching content profile list 170. As a result, although the content profile 160 for a video 205 may be logically close to the target video content profile 165, the content profile 160 is not included in the matching content profile list 170 if the video 205 for the content profile 160 fails to satisfy one of the popularity tests.

In one embodiment, content profiles 160 that are not owned and/or managed by one or more specified entities such as the content provider 140 may be removed from the matching content profile list 170. By excluding videos 205 that are not owned and/or managed by a specified entity, total revenue for the specified entity may be increased. The ownership status and/or management status of the content profile 160 may be determined from the ownership data 260.

The identification module 415 may link the video 205 of the matching content profile 160 to the target video and the method 500 ends. In one embodiment, the identification module 415 links each video 205 with a content profile 160 on the matching content profile list 170 to the target video. The link may be established between the target video and each video 205 with a content profile 160 on the matching content profile list 170 on the content host 105.

The embodiments identify matching video content by recording characteristics of the plurality of videos 205. The embodiments further calculate a content profile 160 for each video 205. In addition, the embodiments identify one or more matching content profiles 160 that are within the content proximity 360 of the target video content profile 165 for a target video. The matching content profiles 160 may be linked to the target video. As a result, similar, relevant video content is linked to the target video, increasing the exposure of the target video and the related videos 205 and increasing revenues.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer implemented method for matching video content comprising:
    recording, by use of a processor, characteristics of a plurality of videos, the characteristics comprising keywords, views, comments, subscriptions to content channels, uploaded content, likes, user followings, ownership, content, characters, topics, tags, demographics, popularity, and user identities;
    calculating content profile elements comprising keyword data, view data, comment data, subscription data, upload data, like data, upload data, like data, user data, following data, ownership data, content data, character data, topic data, tag data, demographic data, and popularity data from the keywords, the views, the comments, the subscriptions to content channels, the uploaded content, the likes, the user followings, the ownership, the content, the characters, the topics, the tags, the demographics, the popularity, and the user identities;
    calculating a content profile for each video as a multidimensional coordinate of the content profile elements in a profile space;
    calculating a content proximity of a target video content profile as a function of a weight vector, wherein the content proximity is a volume in the profile space;
    identifying a matching content profile within the content proximity; and linking the video of the matching content profile to a target video corresponding to the target video content profile.

2. The method of claim 1, wherein the matching content profile further has a number of likes that exceeds a like threshold.

3. The method of claim 1, wherein the matching content profile further has a number of user followings that exceeds a following threshold.

4. The method of claim 1, wherein the matching content profile is further identified with one of a linear programming algorithm, a blossom algorithm, an un-weighted bipartite algorithm, a weighted bipartite algorithm, and a maximum matching edge algorithm.

5. An apparatus for matching video content comprising:
    a processor;
    a memory storing program code executable by the processor to:
        record characteristics of a plurality of videos, the characteristics comprising keywords, views, comments, subscriptions to content channels, uploaded content, likes, user followings, ownership, content, characters, topics, tags, demographics, popularity, and user identities;

calculate content profile elements comprising keyword data, view data, comment data, subscription data, upload data, like data, upload data, like data, user data, following data, ownership data, content data, character data, topic data, tag data, demographic data, and popularity data from the keywords, the views, the comments, the subscriptions to content channels, the uploaded content, the likes, the user followings, the ownership, the content, the characters, the topics, the tags, the demographics, the popularity, and the user identities;

calculate a content profile for each video as a multidimensional coordinate of the content profile elements in a profile space;

calculate a content proximity of a target video content profile as a function of a weight vector, wherein the content proximity is a volume in the profile space;

identifies the matching content profile within the content proximity; and link the video of the matching content profile to a target video corresponding to the target video content profile.

6. The apparatus of claim 5, wherein the matching content profile further has a number of likes that exceeds a like threshold.

7. The apparatus of claim 5, wherein the matching content profile further has a number of user followings that exceeds a following threshold.

8. The apparatus of claim 5, wherein the matching content profile is further identified with one of a linear programming algorithm, a blossom algorithm, an un-weighted bipartite algorithm, a weighted bipartite algorithm, and a maximum matching edge algorithm.

9. A program product for matching video content comprising a non-transitory computer readable storage medium storing program code executable by a processor to perform:

recording characteristics of a plurality of videos, the characteristics comprising keywords, views, comments, subscriptions to content channels, uploaded content, likes, user followings, ownership, content, characters, topics, tags, demographics, popularity, and user identities;

calculating content profile elements comprising keyword data, view data, comment data, subscription data, upload data, like data, upload data, like data, user data, following data, ownership data, content data, character data, topic data, tag data, demographic data, and popularity data from the keywords, the views, the comments, the subscriptions to content channels, the uploaded content, the likes, the user followings, the ownership, the content, the characters, the topics, the tags, the demographics, the popularity, and the user identities;

calculating a content profile for each video as a multidimensional coordinate of the content profile elements in a profile space;

calculating a content proximity of a target video content profile as a function of a weight vector, wherein the content proximity is a volume in the profile space;

identifying a matching content profile within the content proximity; and linking the video of the matching content profile to a target video corresponding to the target video content profile.

10. The program product of claim 9, wherein the matching content profile further has one or more of a number of likes that exceeds a like threshold and a number of user followings that exceeds a following threshold.

11. The program product of claim 9, wherein the matching content profile is further identified with one of a linear programming algorithm, a blossom algorithm, an un-weighted bipartite algorithm, a weighted bipartite algorithm, and a maximum matching edge algorithm.

\* \* \* \* \*